US006968242B1

(12) United States Patent
Hwu et al.

(10) Patent No.: US 6,968,242 B1
(45) Date of Patent: Nov. 22, 2005

(54) METHOD AND APPARATUS FOR AN ACTIVE STANDBY CONTROL SYSTEM ON A NETWORK

(75) Inventors: Nan Shan Hwu, Carlisle, MA (US); Jay Ward, Stratham, NH (US); David L. Kryger, Chelmsford, MA (US)

(73) Assignee: Schneider Automation Inc., North Andover, MA (US)

( * ) Notice: Subject to any disclaimer, the term of this patent is extended or adjusted under 35 U.S.C. 154(b) by 732 days.

(21) Appl. No.: 09/707,604

(22) Filed: Nov. 7, 2000

(51) Int. Cl.$^7$ .............................................. G05B 9/02
(52) U.S. Cl. .............................. 700/82; 714/4; 714/11
(58) Field of Search ................................ 709/220, 221; 710/302; 700/2, 82; 713/100; 714/4, 11, 714/13

(56) References Cited

U.S. PATENT DOCUMENTS

| 4,872,106 | A | * | 10/1989 | Slater ........................... 714/13 |
| 4,958,270 | A | * | 9/1990 | McLaughlin et al. .......... 700/82 |
| 5,008,805 | A | * | 4/1991 | Fiebig et al. .................. 700/79 |
| 5,148,433 | A | | 9/1992 | Johnson |
| 5,313,386 | A | * | 5/1994 | Cook et al. .................... 700/82 |
| 5,367,646 | A | * | 11/1994 | Pardillos et al. .............. 710/63 |
| 5,526,489 | A | * | 6/1996 | Nilakantan et al. .......... 709/228 |
| 5,777,874 | A | * | 7/1998 | Flood et al. ................... 700/82 |
| 5,832,228 | A | * | 11/1998 | Holden et al. ............... 709/225 |
| 5,912,814 | A | * | 6/1999 | Flood ............................. 700/2 |
| 5,966,304 | A | * | 10/1999 | Cook et al. .................... 700/82 |
| 5,997,166 | A | * | 12/1999 | Flood ............................. 700/2 |
| 6,049,825 | A | * | 4/2000 | Yamamoto .................. 709/221 |
| 6,097,882 | A | * | 8/2000 | Mogul ......................... 709/201 |
| 6,542,510 | B1 | * | 4/2003 | Fujimori et al. ............ 370/402 |
| 6,584,019 | B1 | * | 6/2003 | Chevallier ............. 365/185.33 |
| 6,615,324 | B1 | * | 9/2003 | Fernald ....................... 711/153 |
| 6,640,314 | B1 | | 10/2003 | Lelaure et al. |

* cited by examiner

*Primary Examiner*—John Follansbee
*Assistant Examiner*—Aaron Perez-Daple

(57) ABSTRACT

A method and apparatus for providing an active standby control system comprising the steps of providing a first and second controller, each controller having an operating state. Each controller is operably connected to a network. Assigning a network identifier, i.e., Internet Protocol, Media Access Control address, etc., to each controller and sensing the operating state of each controller. The network identifier of each controller is determined by the operating state of each respective controller.

15 Claims, 3 Drawing Sheets

METHOD AND APPARATUS FOR AN ACTIVE STANDBY CONTROL SYSTEM ON A NETWORK

RELATED APPLICATIONS

The subject matter of the present application is related to the following commonly assigned applications, U.S. patent application Ser. No. 09/612,636, filed on Jul. 7, 2000, entitled "A Method And Apparatus For An Active Standby Control System On A Network" and U.S. patent application Ser. No. 09/707,690, filed simultaneously with this patent application, entitled, "A Method And Apparatus For An Active Standby Control System On A Network." The contents of these Applications are expressly incorporated herein by reference.

TECHNICAL FIELD

The present invention relates to a control system. More particularly, the present invention relates to a control system utilizing a backup configuration of controllers on a network.

BACKGROUND OF THE INVENTION

Controllers such as programmable logic controllers (PLC) have been implemented in duplex or back-up system configurations where downtime of a system cannot be tolerated. Such a control system delivers high reliability through redundancy. Generally, the duplex configuration incorporates a pair of PLCs assembled in a hot or active standby, or back-up, configuration wherein one PLC is operating in a primary mode and the other PLC is functioning in a secondary or standby/backup mode. The primary controller runs an application by scanning a user program to control and monitor a remote IO network. The other, secondary, controller acts as the active standby controller. The standby controller does not run the application and it does not operate the remote IO. The standby controller is updated by the primary controller with each scan. The standby controller is then ready to assume control of the control system within one scan if the primary controller fails to operate or is removed from operation.

The primary and secondary controllers are interchangeable and can be swapped or switched when desired. Either controller can be placed in the primary state. The active standby configuration requires the non-primary controller to be placed in the standby mode to secure the system's redundancy. The controllers continuously communicate with each other to ensure the operability of the control system. The communication among the controllers is used to determine if a swap of the controllers should be initiated due to a system failure or by election of an operator.

Factory automation systems are increasingly being integrated with communication networks. Control systems are being implemented on networks for remote monitoring and control of devices, processes, etc. System failures involving the primary mode controller that can shut down the control system are avoided by having a back-up controller readily available in hot/active standby mode to replace the failing primary mode controller.

Signal communication between device modules on a network requires network identifiers, i.e., Internet Protocol address, Media Access Control address; to be assigned to these devices throughout the network. Problems arise when the network device or controller fails and must be replaced. The failing primary controller on a network cannot be readily exchanged with a standby controller because the network identifier assigned to the network device, specifically the standby controller, is not readily associated with the primary controller.

Other drawbacks exist due to the physical structure of the control system. The control system utilizes a backplane for operably connecting modules for communicating throughout the network. Generally, data transfers are sent from a central processing unit (CPU) of the primary controller to a network interface module of the primary controller via the primary controller's backplane. A 10 Mb/sec fiber optic cable communicably links the pair of controllers wherein data flows between the network interface module of the primary controller and the network interface module of the secondary controller. From the secondary controller's network interface module, the data must again travel through a backplane to reach the CPU of the secondary controller. Communication between selected network modules involving the backplane hampers the transfer of data and adversely affects the performance of the data transfer. Due to the relatively slow backplane interface, this configuration is inadequate when faster data transfer rates on the control system are desired.

The present invention is provided to solve these and other problems.

SUMMARY OF THE INVENTION

The present invention is directed to a method and an apparatus for exchanging controllers of a control system configured in an active standby, duplex or redundant set-up. The configuration of the control system increases the rate and reliability of the data transfer between the active and standby controllers. It is an object of this invention to provide an active standby control system integrated on a communication network capable of replacing a controller without significantly disrupting the performance of the control system or the network.

One embodiment of the present invention is directed to a method of providing an active standby control system. A first (primary) and a second (secondary) controller, each controller having an operating state, are operably connected to each other and to a network. A network identifier, i.e., Internet Protocol address (IP), Media Access Control address (MAC); is associated with each controller. The operating state of each controller is sensed wherein the network identifier associated with each controller is determined by the operating state of each respective controller.

The control system operates normally until a failure in the primary mode controller is detected or a controller exchange is selected by an operator. Upon detecting a primary mode controller failure, the secondary mode controller configured in active standby is substituted in place of the failed primary mode controller. The network identifier initially associated with the original primary mode controller is associated with the newly substituted primary controller. Thus the network identifier of the control system's primary mode controller remains the same regardless of which controller is functioning as the primary mode controller. The exchange of the controllers is accomplished without significantly disrupting the performance of the overall control system by substantially suspending or delaying the network's operation. Accordingly, the associated network identifiers of the controllers are also exchanged. Alternatively, any combination of IP and MAC addresses of the controllers can be exchanged.

Yet another embodiment of the present invention is directed to an active standby system for a control system. The active standby system comprises a first and a second controller. Each controller has an operating state. A high speed fiber optic network cable operably connects the first and second controllers for transferring data between the controllers at a rate of at least 100 Mb/s. A network identifier is assigned to each controller and is responsive to the operating state of the respective controllers. Each controller comprises: a processor; a co-processor; an operating system executed by the processor; and, a co-operating system executed by the co-processor wherein the operating system and the co-operating system cooperate to transfer data between the first and second controllers.

A further embodiment of the present invention includes remote IO modules such as sensors, relays, gauges, valves, message displays, switches, limit switches, proximity switches, motor starters, motor controllers and any other like device as well as traditional IO modules for control systems; operably connected to the control system.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION OF THE PREFERRED EMBODIMENT

Figure 1:
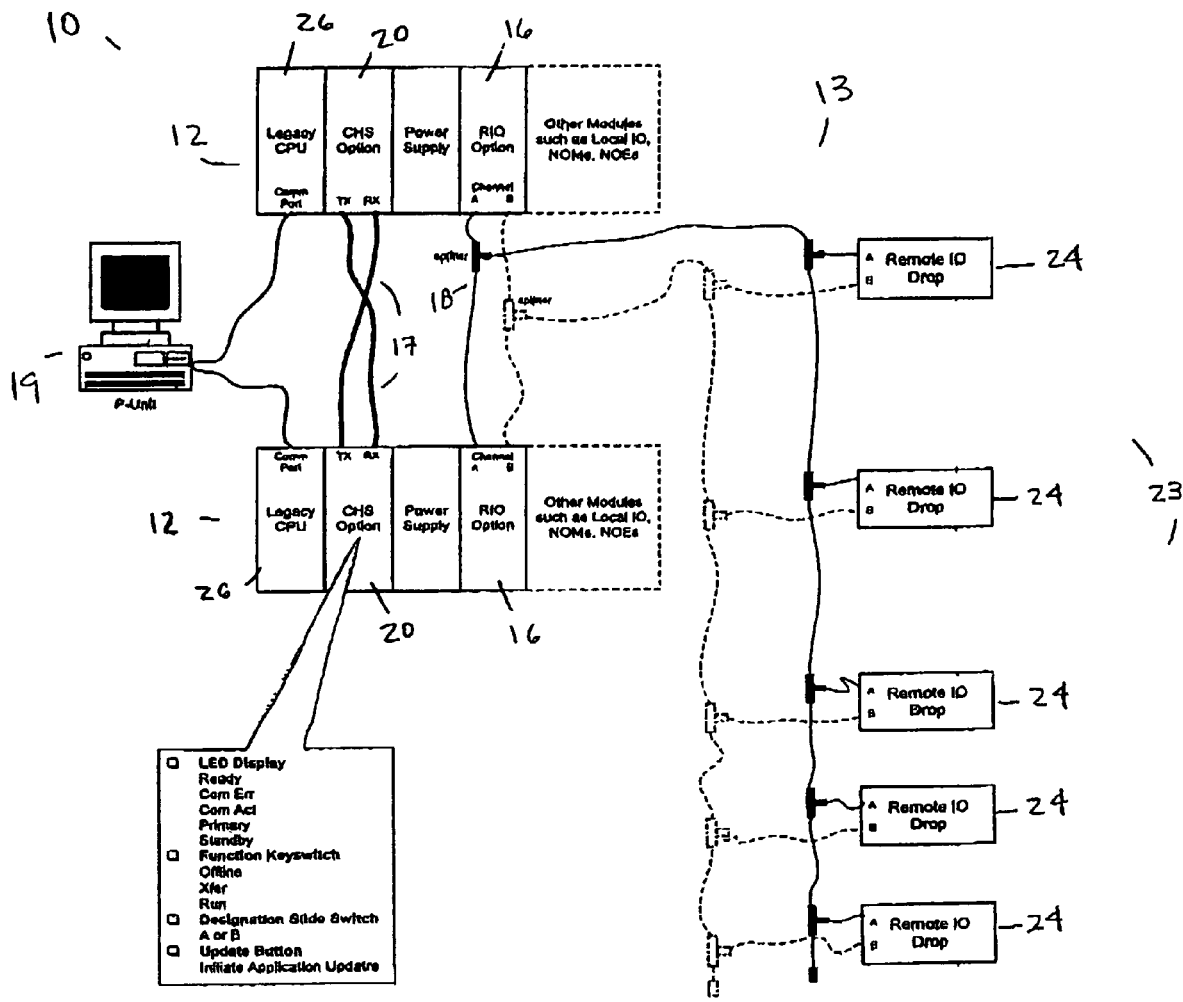
FIG. 1 is a block diagram showing an active standby control system network known by one of ordinary skill in the field of this invention prior to this invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Controllers have been integrated with control systems in an active, hot standby or backup configuration wherein the primary controller can be swapped or exchanged by operator personnel with a readily available backup controller when a failure to the primary controller is detected. Factory automation networks allow operator personnel to monitor the control system from a remote site. In an active standby configuration, a pair of controllers, preferably programmable logic controllers, are arranged in communication with each other. One of the controllers is designated a primary controller and actively monitors and controls a network while the other controller functions in a hot standby mode for backing up the primary controller. If the primary controller fails or is taken out of service, the backup controller will be swapped in its place without significantly disrupting network operations. An additional concern for a network is the network identifier associated with each network device. Each individual device on the network is assigned a network identifier, preferably an Internet Protocol (IP) address. Thus, the exchange of controllers on the network also requires the exchange of their respective network identifiers.

Shown in FIG. 1 is an active standby control system 10 generally known by one of ordinary skill in the field of this invention. The system 10 includes a pair of controllers 12 operably connected to a network 13 in a hot standby, back-up, redundant configuration. The controller 12 also includes a central processing unit (CPU) module 26, a hot standby module 20, and a remote IO head 18. The controller's modules are positioned in a rack unit and the location of the modules within the rack unit is arbitrary such that the location of each module within the rack unit is not standard. The hot standby module 20 of each controller 12 is operably connected to each other using a fiber optic cable 17 capable of handling data transfers at a rate of approximately 10 Mb/s. The CPU modules 26 of each controller 12 are operably connected to a processor unit 19 such as a computer, personal computer or any other device having processing capabilities. The serial link 17 connection between the hot standby modules 20 can be either low-speed or high-speed. The processor unit 19 always communicates with the primary controller at the same network identifier regardless of which controller 12 is functioning as the primary controller. The respective remote IO heads 18 are also connected to each other, and to the local and remote IO network 23, i.e., drops 24.

Existing control systems as shown in FIG. 1 utilize a backplane during data transfers from the primary to the standby controller. The modules shown in FIG. 1 are operably connected to the system 10 and each other through a backplane of each controller 12. The modules of each controller 12 must communicate with each other to successfully exchange their respective network identifiers. Determinism of the system's communication is adversely affected by delays or failures in data transfers between the controllers 12. Communication between the two controllers requires that data be sent from the primary CPU module 26 to the primary hot standby module 20 via the backplane of the controller 12, typically including an ASIC interface. The data is further transmitted to the hot standby module 20 of the secondary controller via a 10 Mb/s fiber optic link 17. The data is then transmitted through the backplane of the secondary controller and another ASIC interface of the standby controller to the CPU module 26 of the secondary controller.

Figure 2:
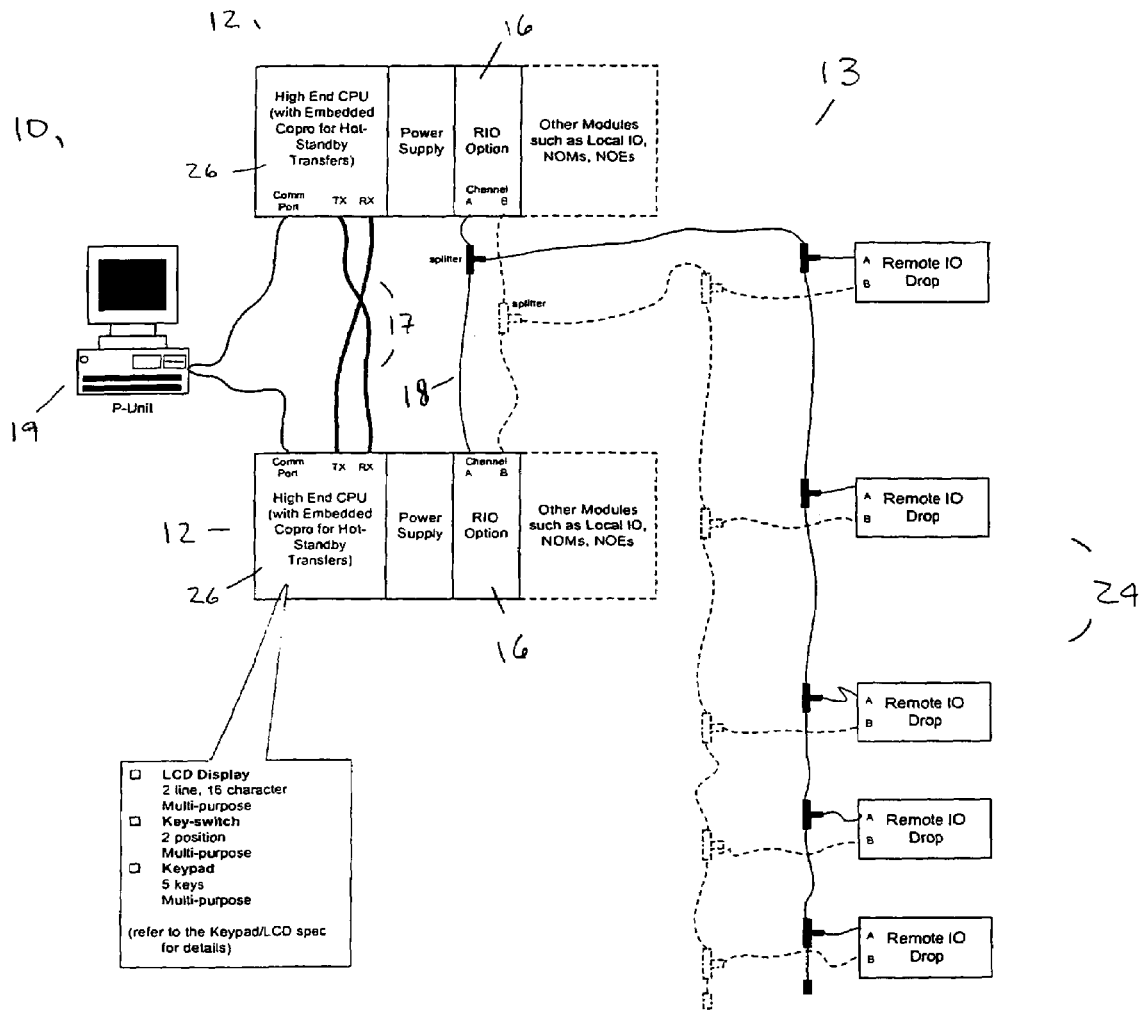
FIG. 2 is a block diagram depicting an embodiment of the present invention; and, FIG. 3 is a block diagram of an embodiment of the firmware organization of the present invention.

FIG. 2 is directed to an embodiment of the present invention for a control system wherein the transfer rate of data between the controllers 12 is significantly increased. Each controller includes a CPU module 26. Embedded within the CPU module 26 is a dedicated hot-standby transfer port. The hot-standby transfer port of each controller 12 is operably connected via a 100 Mb/s fiber optic cable 17. A processing unit 19 is operably connected to the controllers 12, preferably through a Universal Serial Bus (USB) connection or a communication card in a PCMCIA slot. As with earlier active-standby control systems, the network processing unit 19 communicates with the primary controller 12 at the same network identifier, regardless of which controller 12 is functioning as the primary.

The present invention significantly improves data transfer rates between the controllers by incorporating a higher rated fiber optic cable 17 and eliminating a significant portion of data transfers over the backplane. Data is transmitted from the primary to the active standby CPU over the 100 Mb/s fiber optic cable 17, preferably utilizing Ethernet 100 Mb/s.

Figure 3:
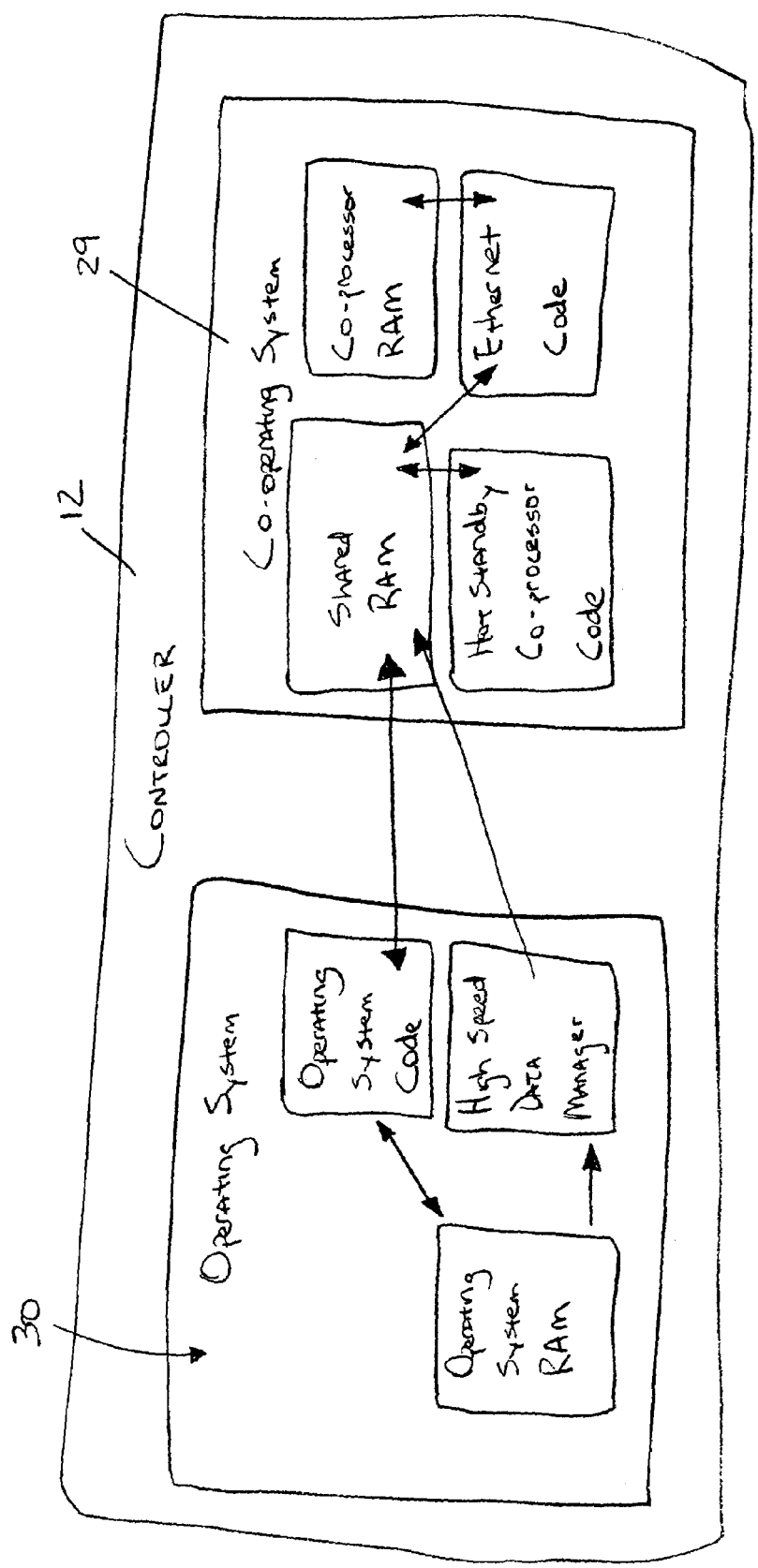

The high end CPU 26 shown in FIG. 2 comprises a processor 27, a co-processor (CoPro) 28, an operating system (OS) 30 executed by the processor 27 and a co-operating system 29 executed by the co-processor 28. The RAM of the co-processor 28 executes hot standby data transfers. FIG. 3. The processor 27 and co-processor 28 can be separate or the co-processor can be embedded within the processor. Preferably, the co-processor 28 is embedded in flash RAM. The embedded co-processor 28 handles data transfers between the primary and secondary controllers 12. The transfer of data is over the 100 Mb/s fiber optic link 17. In this configuration, the data will no longer need to be transmitted over a relatively slow backplane and ASIC interface. Instead, the data will travel from the processor's OS 30 to the co-processor's co-operating system 29 over a much higher internal data bus. The embedded modules facilitate the use of standard wiring and transfer protocols throughout the control system network, thus increasing the rate of data transfers between the controllers 12. Additionally, it is possible to transfer a complete application program stored in one controller, regardless of its size. The transfer is accomplished over multiple scans and will comprise multiple transfer data packets.

The direction of the data transfer is shown by the arrows in the FIG. 3. The main functions of the OS 30 include: moving data between the OS 30 memory and the CoPro's 28 shared memory and directed system checks when necessary. The CoPro's functions include: moving data between the primary and the standby controllers and transmitting/monitoring the health communication signal.

Specifically, the OS code initiates all hot-standby activity; prepares and controls the transfer of data to the CoPro shared memory (primary controller); retrieves data from the CoPro's shared memory and places it into the appropriate memory location (standby controller); interacts with the remote IO (RIO) head 16 for active standby diagnostics; and controls serial and MB+ address changes on the controller.

The CoPro code builds messages for transmission on the Ethernet connection (primary controller); processes incoming data messages and puts data in shared memory (standby controller); monitors the health of the Ethernet communication; initiates the healthy communication message (primary controller); monitors the active standby health communication message; and is responsible for all inter-station communication, i.e., change state, application program download requests, etc.

The transfer of data from the primary controller to the standby controller is preferably by blocks and includes: state RAM (located variables); all unlocated global variables; all instances of DFB and EFB data; SFC variable area and system bits and words. It is also possible to upload the configuration and application program from the primary controller and download it to the standby controller, thus providing an identical image and enabling the standby controller to take over as the primary controller.

The main processor 30 communicates with the co-processor 28 at the beginning of every scan. If the co-processor 28 reports any error, or does not respond within a predetermined period, the primary controller will attempt to transfer control to the standby controller through the RIO link 18. If the standby controller responds, the primary controller releases control and the standby controller will operate in stand-alone mode. If the standby controller does not respond to the primary controller's request to assume control, the primary controller will operate in stand-alone mode and continue to scan the IO.

When a controller has an error, it can report the error to the other controller by sending a message to the other controller through either the fiber optic cable 17 or the RIO link 18. The controllers 12 can also identify a "failure to respond error" by detecting a time-out during the link activity. To ensure that the standby controller can detect the error as soon as possible, the primary controller is responsible for keeping the links active. This is accomplished by transmitting a health communication message to the standby controller every 10 milliseconds when no information is being sent via the fiber optic cable 17; and every 5 ms if no communication is required with any IO drop 24 or RIO link 18. If the standby controller does not receive the message in the predetermined time, it will attempt to determine the cause of the failure and assume control if necessary.

Each controller 12 has three operating states, i.e., primary, secondary and offline. In the primary state, the controller 12 is running and exchanging IO data over the remote IO network 23. In the secondary state, the controller 12 is running, but is not exchanging IO data over the remote network 23. The primary controller can exit the primary state either due to a hardware failure or a self-check failure within the controller 12. The state of the secondary controller 12 will automatically transition to the primary state if the primary mode controller 12 leaves the primary state. When the primary controller 12 changes from primary to secondary or offline, the controllers 12 will swap their respective network identifiers, preferably IP addresses, and the new primary controller 12 will resume scanning. When the controllers 12 exchange IP addresses, it appears to the remote nodes 24 as if the primary controller has been reset.

In addition, operator personnel can instruct the control system 10 to change the state of the primary control module 12. A control module 12 in the offline state cannot enter the primary state without first going through the secondary state. The allowable hot standby state transitions for the controllers 12 are: one controller is in the primary state and the other controller is in the secondary state; one controller is in the primary state and the other controller is in the offline state; and both controllers are in the offline state.

When the controller 12 changes from secondary to primary mode, the controllers will exchange their respective network identifiers within ten to fifteen milliseconds. The exchange of network identifiers requires the controller to perform various cleanup activities. When a swap occurs, the primary will reset the IO scanner's connection prior to exchanging the IP addresses. This will minimize the time required by the new primary IO scanner to establish a connection with a remote device 24. The time to reset the IO scanner's connection is in the order of several milliseconds. The IO scanner will establish new connections and start scanning in approximately 200 milliseconds. Alternatively, a reverse address resolution protocol (RARP) request can be broadcast by the primary controller to discover its IP address. In this case, the primary controller broadcasts its physical address and a RARP server replies with the primary controller's IP address.

For the redundant control system to function properly, the primary and secondary controllers must be solving an identical logic program, which is updated on every scan by a data transfer of state RAM between the two controllers. By default, the standby controller is set to go offline if a logic mismatch is detected between the programs of the standby and primary controllers. A controller swap will not occur if the non-primary controller is offline. An operator of the control system can select to override the system default for a logic mismatch and thus allow a swap between controllers 12 to occur if a logic mismatch exists between the controllers.

Under normal operating conditions, both controllers 12 have the same application program loaded. System checks are in place to detect if there is a logic mismatch. A logic mismatch can occur when the application program is initially the same on both the primary and secondary controller, but an on-line change has occurred to the program of one of the controllers. A logic mismatch can also occur when the primary and standby controllers have different applications from the onset of the control system's execution. The system's default provides that when a mismatch exists, the standby controller is placed in the off-line state and a swap of the controllers is not allowed. However, there are situations when it is desirable to allow a logic mismatch to exist and to continue to operate the system in the active standby configuration. It is important to note that if the settings are configured to ignore a logic mismatch and a swap of the controllers is executed, the standby controller will assume the role of the primary controller and will execute a different application program from the previous controller 12.

Once an active standby control system is operating, it is normally not shut down, even for periodic maintenance. However, there are conditions where the user desires to modify the application program without disrupting the control system. One situation in which a user may desire to ignore a logic mismatch between the controllers is during on-line editing of one of the controller's programs. As is readily apparent, any edits executed on-line will immediately trigger a logic mismatch between the controllers, therefore the settings on the controller must be set accordingly to allow the difference between the two programs. After the edits have been made, the user can either use an application transfer feature or the processing unit 19 to reload the standby controller with the edited primary program.

The following steps are provided as an exemplification of the on-line editing sequence and are not to be used as a limitation to the present invention as claimed and disclosed within this application. The logic mismatch feature is enabled to allow the standby controller to remain on-line in the event that a logic mismatch between the controllers is detected. The user can now make any edits or modifications to the application program of the standby controller. After completion of the edits, the new program is tested by initiating a switch-over of the controllers. If unsuccessful, another switch-over can be initiated to return to the original program. If the edits to the program work as expected, an application transfer can be executed to synchronize the programs between the controllers. Finally, the logic mismatch feature is disabled. Generally, it will not matter whether edits to the program application are first made to the primary controller or the standby controller. However, any edits made to the application program of the primary controller are immediately executed.

Another situation where it is desirable to ignore a logic mismatch is when a systematic shutdown process is implemented in the control system. The systematic shutdown process requires the primary controller to be configured to control and monitor the normal operation of the control system and the standby controller is configured to control a systematic shutdown of the control system in the event of a failure to the primary controller. When a problem with the primary controller occurs, the controllers will swap and the systematic shutdown procedure of the new controller will be executed to shut down the control system. Thus, in this type of control system configuration, a logic mismatch exists between the controllers, yet it is undesirable to place the standby controller in an off-line mode.

Some controller application programs are written wherein the programmer controls the logical and physical storage of data. The check for a logic mismatch for these types of programs examines both the data and the location of the data. Other controller programs are written wherein the programmer only controls the logical storage of the data and not the physical storage of the data. In these types of programs, the storage of the data is dynamic and controlled by the platform of which the program is run. Therefore, the detection of a logic mismatch will not include examining the physical location of the stored data.

Other situations where it is desirable to ignore a logic mismatch exists where support of off-line modified projects are being downloaded to the standby controller or when getting up to date process data transferred from the active controller.

A transfer application feature provides the user with the ability to configure the standby controller from the primary controller. The transfer application copies the full program and ensures that the controllers have identical configurations. The transfer is accomplished over the communication link, preferably a fiber optic cable 17, operably connecting the control processing units of each controller 12. The user requests the transfer through the standby controller, preferably at a front panel keypad. The complete application program and data, including state RAM, will be copied from the primary controller to the standby controller. The standby controller will then validate the transferred program and if valid, the CPU will automatically start. The user can specify the operating mode to be executed after a program transfer to either "run" or "off-line." The transfer can be executed using multiple controller scans to minimize the per scan impact on the primary controller. During the transfer, the control system is not considered redundant because the standby controller is not capable of assuming control if the primary controller fails.

Scan and transfer times of the controllers can be reduced by configuring a portion of RAM as an area not to be included in the transfer of data between the controllers. Any area of data designated as a non-transfer area will not be included during a transfer of state RAM data from the primary to the standby controller. The system operator has flexibility in determining how much or how little state RAM is selected for transfer. However, state RAM that is associated with critical IO functions should be transferred in every scan. The operator can also select how much data gets transferred in all scans and how much gets transferred in pieces over multiple scans.

The controllers' executive programs are also upgradeable without having to shutdown the control system. During the upgrade, the control system is not considered to be in a redundant configuration. If the primary controller should fail prior to the upgrade being complete, the standby controller will not be available to gain control as the primary controller.

While specific embodiments have been illustrated and described, numerous modifications come to mind without significantly departing from the spirit of the invention and the scope of protection is only limited by the scope of the accompanying claims.

We claim:
1. A control system comprising:
 a host processor;
 a first controller communicatively coupled to the host processor, the first controller being associated with a first network identifier, the first controller including a first central processing unit module connected to a second module via a first backplane;

a second controller communicatively coupled to the host processor, the second controller being associated with a second network identifier, the second controller including a third central processing unit module connected to a fourth module via a second backplane; and a fiber optic cable connecting the first module of the first controller and the third module of the second controller;

wherein the first controller is programmed to transfer the first network identifier to the second controller via the fiber optic cable and not via either one of the first backplane and the second backplane, the transfer being in response to detecting an error associated with the first controller.

2. A control system as defined in claim 1, wherein the first module of the first controller comprises:

a processor;

a co-processor;

an operating system executed by the processor; and, a co-operating system executed by the co-processor wherein the operating system and the co-operating system cooperate to transfer data between the first module of the first controller and the third module of the second controller.

3. A control system as defined in claim 1, wherein the first controller comprises a network module and the first network identifier is determined by an operating state of the first controller.

4. A control system as defined in claim 1, wherein the first controller comprises a remote IO head operably connected to a remote IO drop.

5. A control system as defined in claim 1, wherein the first network identifier comprises an Internet Protocol address.

6. A control system comprising:

a host processor;

a first controller communicatively coupled to the host processor, the first controller being associated with a first network identifier, the first controller being connected to a first backplane and including a first computer processing unit module;

a second controller communicatively coupled to the host processor, the second controller being associated with a second network identifier, the second controller being connected to a second backplane and including a first computer processing unit module; and a fiber optic cable connecting the first computer processing unit module of the first controller and the first computer processing unit module of the second controller;

wherein the first controller is programmed to transfer the first network identifier to the second controller via the fiber optic cable and not via either one of the first backplane and the second backplane, the transfer being in response to detecting an error associated with the first controller.

7. A control system as defined in claim 6, wherein the first computer processing unit module of the first controller comprises:

a processor;

a co-processor;

an operating system executed by the processor; and a co-operating system executed by the co-processor wherein the operating system and the co-operating system cooperate to transfer data between the first controller and the second controller.

8. A control system as defined in claim 6, wherein the first controller comprises a network module and the first network identifier is determined by an operating state of the first controller.

9. A control system as defined in claim 6, wherein the first controller comprises a remote IO head operably connected to a remote IO drop.

10. A control system as defined in claim 6, wherein the first network identifier comprises an Internet Protocol address.

11. An active standby control system comprising:

a host processor unit;

a first controller communicatively coupled to the host processor unit, the first controller including a first module having a processor and a transfer port, and a second module connected to the first module by a backplane, the first controller further communicatively coupled to a plurality of remote Input-Output (IO) drops;

a second controller communicatively coupled to the host processor unit, the second controller including a first module having a processor and a transfer port, and a second module connected to the first module by a backplane, the second controller further communicatively coupled to the plurality of remote IO drops; and a cable connected to the transfer port of the first module of the first controller and connected to the transfer port of the first module of the second controller for transferring data between the first module of the first controller and the first module of the second controller and not via either one of the backplane of the first controller and the backplane of the second controller, the transfer being in response to detecting an error associated with the first controller and for the purpose of switching to the second controller.

12. The active standby control system of claim 11 further comprising a co-processor in the first module of the first controller for executing data transfers over the cable.

13. The active standby control system of claim 12 wherein the co-processor is embedded in the processor.

14. The active standby control system of claim 11 wherein the cable is a fiber optic cable.

15. The active standby control system of claim 14 wherein the cable utilizes Ethernet.

* * * * *